United States Patent [19]
Shallis

[11] Patent Number: 5,622,066
[45] Date of Patent: Apr. 22, 1997

[54] BICYCLE LOCK EXTENSION LINK AND METHOD

[76] Inventor: Sean T. Shallis, 339 Bloomfield St., Apt. 2, Hoboken, N.J. 07030

[21] Appl. No.: 373,556

[22] Filed: Jan. 17, 1995

[51] Int. Cl.⁶ .............................. B62H 5/16; E05B 71/00
[52] U.S. Cl. ..................... 70/233; 70/18; 70/51; 70/227; 70/234
[58] Field of Search ................. 70/18, 227, 233–235, 70/51, 225, 226, 228, 236; 280/288.4

[56] References Cited

U.S. PATENT DOCUMENTS

| | | | |
|---|---|---|---|
| 1,809,003 | 6/1931 | Van Vorst | 70/233 X |
| 3,832,871 | 9/1974 | Kaufmann | 70/227 |
| 3,865,246 | 2/1975 | Lieb et al. | 70/234 X |
| 3,886,770 | 6/1975 | Smith | 70/18 |
| 4,007,614 | 2/1977 | Schott et al. | 70/234 |
| 4,015,718 | 4/1977 | Bernard | 70/235 X |
| 4,079,872 | 3/1978 | Halter | 70/233 X |
| 4,085,600 | 4/1978 | Bindari | 70/39 |
| 4,155,231 | 5/1979 | Zane et al. | 70/18 |
| 4,188,808 | 2/1980 | Valdez | 70/227 X |
| 4,257,248 | 3/1981 | Williams | 70/236 |
| 4,571,965 | 2/1986 | LeRoux | 70/227 |
| 5,010,746 | 4/1991 | Zane et al. | 70/39 |
| 5,157,954 | 10/1992 | Pietras | 70/227 |
| 5,333,476 | 8/1994 | Byrd, Jr. | 70/38 A |

FOREIGN PATENT DOCUMENTS

| | | | |
|---|---|---|---|
| 814786 | 6/1937 | France | 70/227 |
| 823839 | 1/1938 | France | 70/233 |
| 2370622 | 7/1978 | France | 70/18 |
| 3920980 | 3/1990 | Germany | 70/233 |
| 249533 | 4/1948 | Switzerland | 70/233 |
| 151494 | 9/1920 | United Kingdom | 70/227 |
| 173940 | 1/1922 | United Kingdom | 70/227 |
| 693503 | 7/1953 | United Kingdom | 70/227 |
| 2120190 | 11/1983 | United Kingdom | 70/233 |

*Primary Examiner*—Lloyd A. Gall
*Attorney, Agent, or Firm*—Arthur Jacob

[57] ABSTRACT

An improvement in a bicycle lock extends the ability of an existing bicycle lock of the type having a U-shaped shackle to secure a bicycle to a post, against theft, by slipping a generally U-shaped essentially rigid link over a leg of the U-shaped shackle of the existing bicycle lock, subsequent to locating the rear wheel of the bicycle in the link, so that upon locking the bicycle frame and front wheel of the bicycle to the post with the U-shaped shackle, the existing bicycle lock also secures the rear wheel of the bicycle against theft.

1 Claim, 2 Drawing Sheets

BICYCLE LOCK EXTENSION LINK AND METHOD

BACKGROUND OF THE INVENTION

1. Field of the Invention

The present invention relates generally to bicycle locks and pertains, more specifically, to an improvement for extending the ability of an existing bicycle lock to secure a bicycle to a post so as to increase the effectiveness of the bicycle lock.

2. Description of The Prior Art

One of the more popular bicycle locks currently available commercially is a bicycle lock which includes a rather large U-shaped shackle having dimensions sufficient to capture the frame and one wheel of the bicycle for securement to a fixed post. One such bicycle lock is made available under the trademark KRYPTONITE and has found favor in the marketplace for convenience in use as well as effectiveness in preventing theft. However, one drawback of the existing U-shaped shackle bicycle locks of the type described is that the limited dimensions of the shackle, dictated by the desire to maintain the size of the lock within manageable dimensions for portability and convenience of use, enable the shackle to capture only the frame and the front wheel of a bicycle for securement to a stationary post, leaving the rear wheel susceptible to theft. In view of the fact that the theft of individual bicycle component parts is on the rise, there is a need for a bicycle lock which has the ability to secure more of the major component parts against theft. While attempts at solving the problem have included increasing the size of the U-shaped shackle to accommodate both wheels of a bicycle, as well as the frame, the result of such a solution is a rather large, somewhat unwieldy structure which, at best, is difficult to carry on a bicycle when the lock is not in use and which is cumbersome in use. Moreover, with so many standard U-shaped shackle locks already in the field, a large number of potential purchasers are reluctant merely to abandon their existing locks and go to the expense of replacing those locks with a completely new lock.

SUMMARY OF THE INVENTION

The present invention provides an improvement to the popular existing U-shaped shackle lock, which improvement extends the ability of the existing lock to secure the frame and both wheels of a bicycle against theft, without requiring replacement of the existing lock. As such, the improvement of the present invention enables a relatively economical solution to the above-outlined problem and exhibits several objects and advantages, some of which are summarized as follows: Provides an adjunct to existing bicycle locks of the type which utilize a U-shaped shackle, for extending the ability of the lock to capture both wheels and the frame of the bicycle, without an inordinate increase in bulk, weight and expense; enables increased effectiveness in an existing bicycle lock with convenience and economy; is readily adapted to currently available bicycle locks without the need for replacement parts, special tools or special skills; is convenient to carry when not in use and easily placed into effective use; provides a rugged construction capable of withstanding the rigors of use throughout an extended service life; enables economical manufacture in large numbers of consistent high quality.

The above objects and advantages, as well as further objects and advantages, are attained by the present invention which may be described briefly as an improvement in a bicycle lock for extending the ability of the bicycle lock to secure a bicycle to a post, the bicycle including a frame, a first wheel and a second wheel, the bicycle lock having a U-shaped shackle including longitudinal legs spaced apart laterally for the reception of the frame, the first wheel and the post between the legs, and a locking bridge for spanning the space between the legs to secure the frame and the first wheel to the post, the improvement comprising: a generally U-shaped essentially rigid link having laterally spaced apart arms and a throat between the arms, the throat including an opening, each arm having a first end and a second end, the opening being located adjacent the first ends and the arms being joined adjacent the second ends, each arm extending longitudinally alongside the throat between the opening and the second end of the arm; and an aperture in each arm adjacent the corresponding first end, the apertures being aligned laterally and having dimensions relative to corresponding dimensions of at least one of the legs of the shackle for enabling passage of the one leg of the shackle through the apertures to span the opening and close the throat such that upon placement of the second wheel within the throat and passage of the one leg through the aligned apertures, the second wheel is secured to the shackle of the bicycle lock and the shackle is available for the reception of the frame, the first wheel and the post for securement of the bicycle to the post. In addition, the invention includes a method for extending the ability of an existing bicycle lock to secure a bicycle to a post, the bicycle including a frame, a first wheel and a second wheel, the bicycle lock having a U-shaped shackle including longitudinal legs spaced apart laterally for reception of the frame, the first wheel and the post between the legs, and a locking bridge for spanning the space between the legs to secure the frame and the first wheel to the post, the method comprising: placing the second wheel within a generally U-shaped essentially rigid link having laterally spaced apart arms and a throat between the arms, the throat including an opening, each arm having a first end and a second end, the opening being located adjacent the first ends and the arms being joined adjacent the second ends, each arm extending longitudinally alongside the throat between the opening and the second end of the arm, and the second wheel being placed within the throat; and passing one of the legs of the shackle through apertures located adjacent the second ends of the arms and aligned laterally with one another, the apertures having dimensions relative to corresponding dimensions of the one leg of the shackle for enabling passage of the one leg of the shackle through the apertures to span the opening and close the throat such that subsequent to placement of the second wheel within the throat and passage of the one leg through the aligned apertures, the second wheel is secured to the shackle of the bicycle lock and the shackle is available for the reception of the frame, the first wheel and the post for securement of the bicycle to the post.

BRIEF DESCRIPTION OF THE DRAWINGS

The invention will be understood more fully, while still further objects and advantages will become apparent, in the following detailed description of a preferred embodiment of the invention illustrated in the accompanying drawing, in which.

DESCRIPTION OF THE PREFERRED EMBODIMENT

Figure 1:
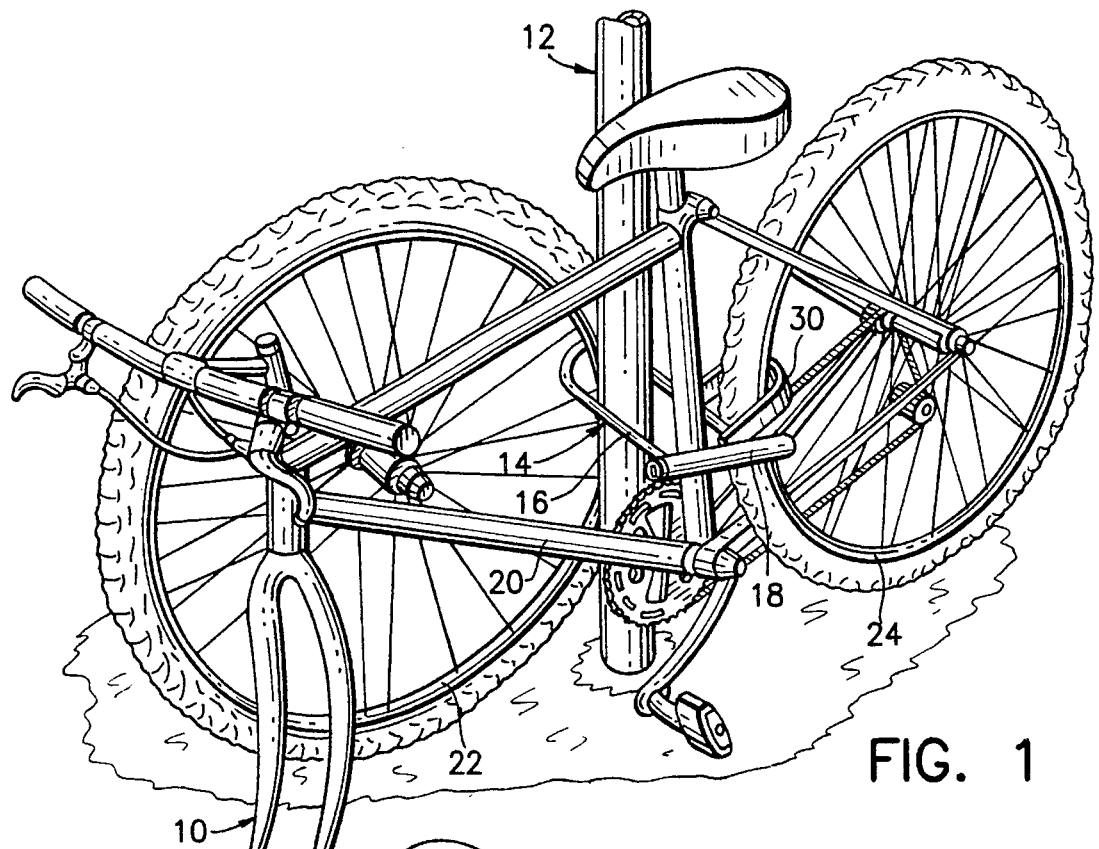
FIG. 1 is a pictorial illustration of the improvement of the present invention in use.
Figure 2:
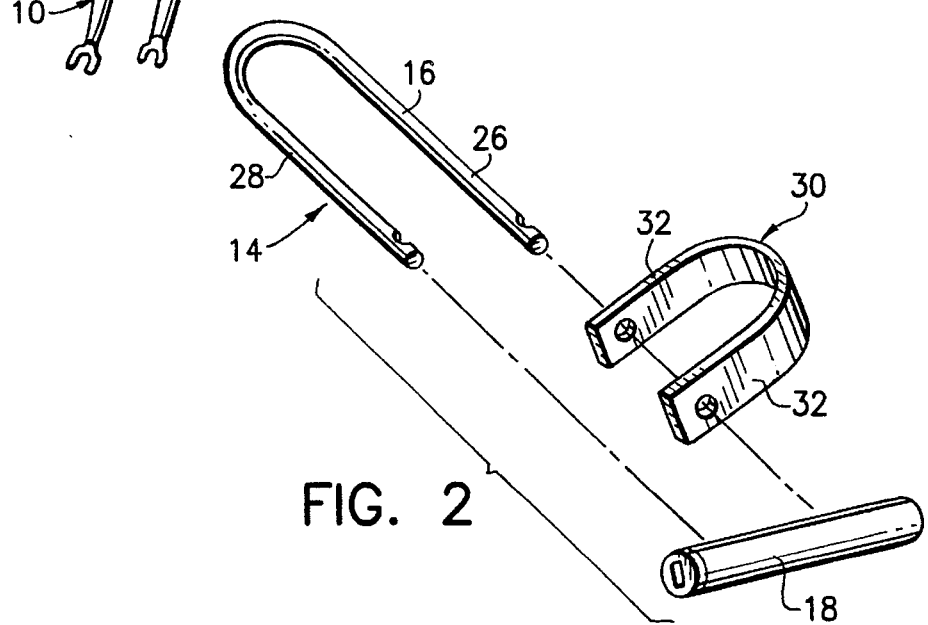
FIG. 2 is an exploded perspective view of a bicycle lock utilizing the improvement of the present invention.

Referring now to the drawing, and especially to FIG. 1 thereof, a bicycle 10 is seen secured to a fixed post 12 by means of a bicycle lock 14 of the type having a U-shaped shackle 16 and a locking bridge 18, such as the now well-known KRYPTONITE bicycle lock. The bicycle 10 has a frame 20, a front wheel 22 and a rear wheel 24. The front wheel 22 has been dismounted from the frame 20, in a well known manner, and is secured to the post 12, along with the frame 20, by the bicycle lock 14. Thus, as best seen in FIG. 2, as well as in FIG. 1, the U-shaped shackle 16 includes a pair of laterally spaced apart legs 26 and 28 between which there is received the frame 20 and the front wheel 22 and upon which the locking bridge 18 is affixed to secure the frame 20 and the front wheel 22 upon the post 12, against theft. However, the rear wheel 24 is of the type which remains mounted on the frame 20 and, hence, is outside the range of the U-shaped shackle 16, leaving the rear wheel 24 susceptible to theft.

In order to protect the rear wheel 24 from theft, the improvement of the present invention employs an adjunct to the bicycle lock 14, in the form of an essentially rigid link 30 having a generally U-shaped overall configuration and including a pair of arms 32 spaced apart laterally and extending longitudinally to receive the rear wheel 24 between the arms 32. The arms 32 are attached to the U-shaped shackle 16 and extend generally perpendicular to leg 26 of shackle 16 so that the rear wheel 24 is captured within the link 30 and is secured against theft, all as will be described in detail below.

Figure 3:
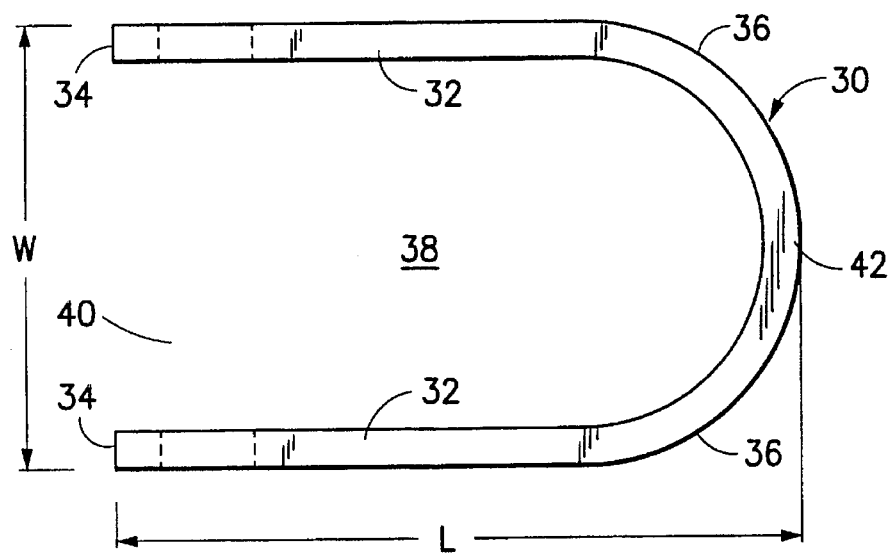
FIG. 3 is a top plan view of the improvement of the present invention.
Figure 4:
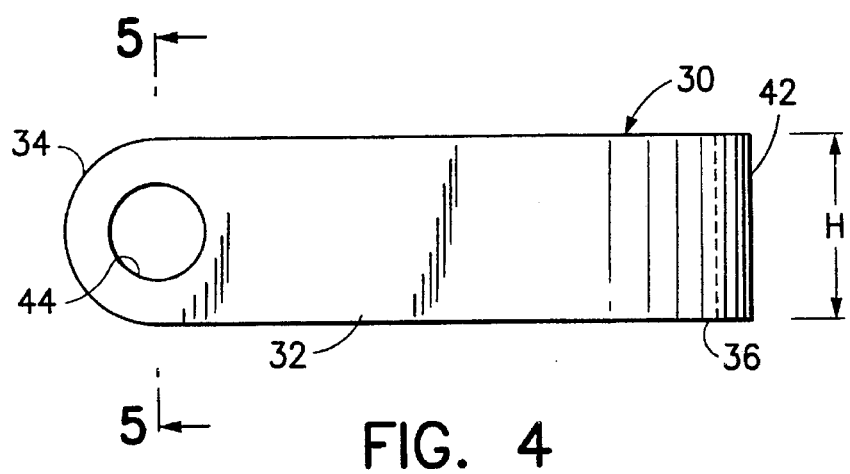
FIG. 4 is a side elevational view thereof.
Figure 5:
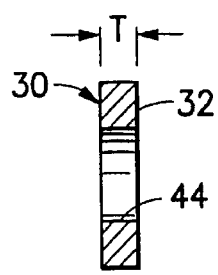
FIG. 5 is a cross-sectional view of one arm of the improvement, taken along line 5—5 of FIG. 4.

Turning now to FIGS. 3 through 5, as well as to FIGS. 1 and 2, each arm 32 of link 30 extends longitudinally between opposite first and second ends 34 and 36, respectively. A throat 38 is located between the arms 32 and includes an opening 40 adjacent the first ends 34 of the arms 32. The arms 32 are joined adjacent the second ends 36 of the arms 32 by a cross-member 42. In the illustrated preferred construction the arms 32 and cross-member 42 comprise a unitary structure formed of a single piece of high-strength steel having a generally rectangular cross-sectional configuration, as seen in FIG. 5. The arms 32 extend longitudinally essentially parallel to one another, alongside the throat 38, and each arm includes an aperture 44 adjacent the first end 34. Apertures 44 are in the form of holes passing through each arm 32 and are aligned laterally with one another, the preferred cross-sectional configuration of the holes being circular and having a diameter so related to the diameter of at least leg 26 so as to enable the leg 26 to be passed through the aligned apertures 44, as illustrated in FIG. 2, subsequent to locating the rear wheel 24 within the throat 38, to span the opening 40 and close the throat 38, thereby capturing the rear wheel 24 within the link 30, and enabling securement of the rear wheel 24 against theft, as seen in FIG. 1.

The compact arrangement of the link 30 and the U-shaped shackle 16 enables ready carrying of the link 30 with bicycle lock 14 while facilitating use of the link 30 in combination with the bicycle lock 14 in the securement of frame 20 and front wheel 22, along with rear wheel 24, against theft. In order to maintain that compact arrangement, while enabling use of the link 30 as described above, the link 30 preferably is constructed with relatively compact dimensions. Thus, link 30 is provided with an overall longitudinal length L of about five inches, an overall lateral width W of about three and one-half inches, an overall altitudinal height H of about one and three-eighths of an inch, and an overall thickness T of about three-sixteenths of an inch. Apertures 44 preferably have a diameter of about three-quarters of an inch so as to enable passage of leg 26 of the U-shaped shackle 16 through aligned apertures 44 with ease. The generally rectangular cross-sectional configuration of the arms 32 establishes the requisite strength and rigidity in link 30 while providing the throat 38 with sufficient lateral width to receive the rear wheel 24 for appropriate securement.

It will be seen that link 30 is relatively simple in construction, enabling economical manufacture and ready availability for use in connection with existing bicycle locks of the type illustrated. The compact nature of link 30 allows the link 30 to be carried easily, when not in use, and readily put into service merely by slipping the link 30 over the leg 26 of the U-shaped shackle 16, subsequent to locating the rear wheel 24 within the link 30. By subsequently locking the locking bridge 18 in place in the already known manner, the rear wheel 24 is secured against theft, along with the frame 20 and the front wheel 22 of the bicycle 10. Hence, the present invention attains the several objects and advantages summarized above; namely: Provides an adjunct to existing bicycle locks of the type which utilize a U-shaped shackle, for extending the ability of the lock to capture both wheels and the frame of the bicycle, without an inordinate increase in bulk, weight and expense; enables increased effectiveness in an existing bicycle lock with convenience and economy; is readily adapted to currently available bicycle locks without the need for replacement parts, special tools or special skills; is convenient to carry when not in use and easily placed into effective use; provides a rugged construction capable of withstanding the rigors of use throughout an extended service life; enables economical manufacture in large numbers of consistent high quality.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A method for extending the ability of an existing bicycle lock to secure a bicycle to a post, the bicycle including a frame, a first wheel and a second wheel, the existing bicycle lock having a U-shaped shackle including longitudinal legs each having a length lone enough and being spaced apart laterally for enabling reception of the frame, the first wheel and the post between the legs, and a locking bridge for spanning the space between the legs to secure the frame and the first wheel to the post, the method comprising:

placing the second wheel within a generally U-shaped essentially rigid one-piece link having laterally spaced apart arms and a throat between the arms, the throat including an opening, each arm having a first end and a second end, the opening being located adjacent the first ends and the arms being joined adjacent the second ends and spaced apart at the opening a lateral distance adapted for reception of the second wheel within the throat, each arm extending longitudinally alongside the throat between the opening and the second end of the arm along a length adapted for reception of the second wheel within the throat such that the second wheel is placed within the throat when the frame, the first wheel and the post are received between the legs of the shackle; placing the frame of the bicycle, the first wheel and the post between the legs of the shackle;

passing one of the legs of the shackle through apertures located adjacent the first ends of the arms and aligned laterally with one another, the apertures having dimensions relative to corresponding dimensions of the one leg of the shackle for enabling passage of the one leg of the shackle through the apertures to span the opening and close the throat; and spanning the space between the leas of the shackle with the looking bridge such that subsequent to placement of the second wheel within the throat, reception of the frame, the first wheel and the post between the legs of the shackle, passage of the one leg through the aligned apertures and spanning the space between the legs of the shackle with the locking bridge, the second wheel is secured to the shackle of the bicycle lock by the link and the bicycle is secured to the post by the shackle.

* * * * *